Feb. 1, 1927.
R. R. SIDDERS
1,616,203
CALF WEANER
Filed Feb. 4, 1926
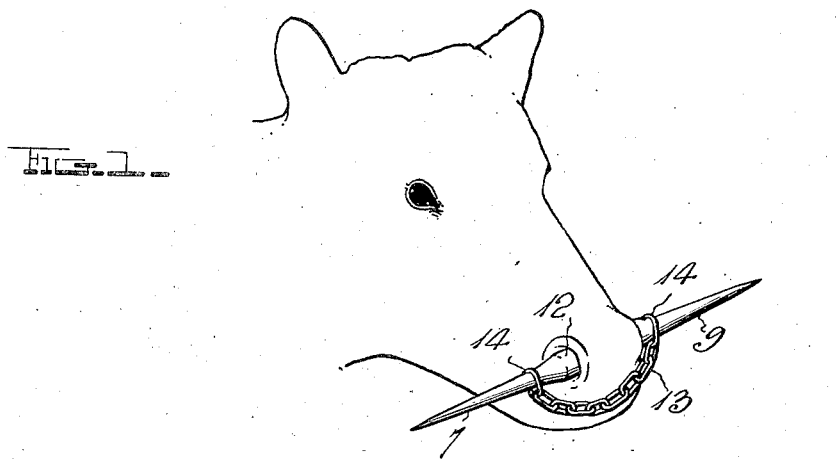
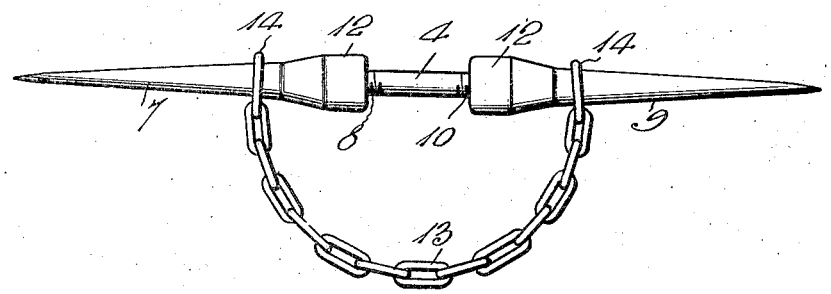
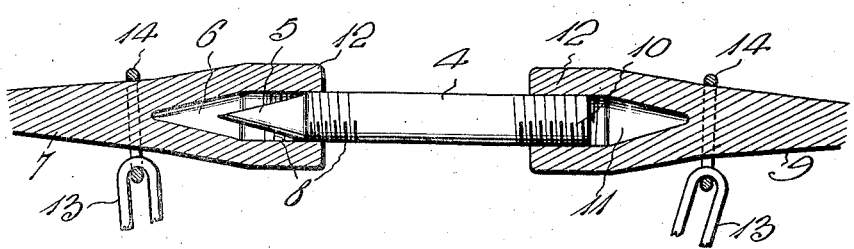
Witness
H. Woodard
Inventor
R. R. Sidders
By H. B. Willson & Co.
Attorneys Patented Feb. 1, 1927.

1,616,203

UNITED STATES PATENT OFFICE.

ROY R. SIDDERS, OF URBANA, OHIO.

CALF WEANER.

Application filed February 4, 1926. Serial No. 86,004.

The invention relates to improvements in devices commonly known as calf weaners, although intended not only to prevent calves from sucking the teats of cows, but to prevent cows from sucking their own teats. The device is of the general type in which a stem passes through the animal's nose cartilage and carries projecting spurs whose function is well known.

One object of the invention is to provide a chain connected with the spurs in a novel manner and adapted to hang loose and free, just in front of the animal's mouth. This chain is in the animal's way when it tries to take its own or any other animal's teat in in its mouth. She will thus shake her head to try and get the chain out of her way and by so shaking, the prongs come in contact with either her udder or the udder of another, as the case may be.

Another object of the invention is to provide one end of the above-named stem with a sharp point which may readily be forced through the nose cartilage when applying the device so that it is not necessary to first punch an opening through such cartilage, to receive the stem, said sharpened stem end being normally disposed within a socket at the inner end of one of the spurs.

With the foregoing in view, the invention resides in the novel subject matter hereinafter described and claimed, the description being supplemented by the accompanying drawing.

Figure 1 is a perspective view showing the application of the invention.

Figure 2 is an enlarged side elevation.

Figure 3 is a detail longitudinal sectional view partly in elevation.

The numeral 4 on the drawings, designates an elongated cylindrical stem which is by preference formed from copper, said stem having a pointed end 5 to be forced through a calf's nose cartilage. This pointed stem end is normally received in a socket 6 which is formed in the inner end of a spur 7, the socket wall and the stem being provided with co-acting screw threads 8 by means of which they may be detachably connected. Projecting from the opposite end of the stem 4, is another spur 9, the latter being preferably identical with the spur 7, in order that no "rights" and "lefts" need be made when manufacturing the device. The stem 4 is provided with screw threads 10 engaging the threads of the socket 11 of this spur 9.

Both spurs 7 and 9 are by preference formed from aluminum, and while the outer ends of these spurs are tapered to sharp points, their inner ends are provided with enlargements 12.

A chain 13 formed of aluminum or other desired metal is provided to pass in front of the month as above described. The endmost links 14 of this chain, surround the spurs 7 and 9 and are sufficiently small to prevent passage of the enlarged spur ends 12 therethrough, so that the chain cannot slide inwardly from said spurs. There is of course sufficient slack in this chain to permit movement of the stem 4 out of engagement with the spur 7 or 9, when the device is to be detached, and it will be understood that both spurs pass rotatably through the links 14, so that the threaded connections may readily be applied or released.

When applying the device, the prong 7 is detached from the stem 4 and using the spur 9 as a handgrip, the pointed end 5 of said stem is forced through the calf's nose cartilage, the chain 13 being then preferably entirely disconnected from both spurs. One of the links 14 of this chain may now be passed over the spur 9 and the spur 7 passed through the other link 14. Then, the spur 7 is threaded upon the stem 4 and the device will be effectively held in place.

It may be added that prior to my invention, a calf weaner was devised having a stem and two prongs or spurs corresponding to the stem 4 and the spurs 7 and 9 and no claim is therefore made to this general construction. The provision of the pointed stem end 5 however, and the novel relation of the chain 13 with the spurs, are original with me and constitute the gist of the present invention.

Points of superiority over similar devices, are that the present invention may be worn continually and will not hinder the animal from eating in any way. It will not cause the nostrils to become sore or irritated. It will not come off after once applied unless taken off by hand, and it cannot easily be broken.

I claim:

1. A weaner comprising a stem for passage through an animal's nose cartilage, spurs projecting from the ends of said stem and enlarged toward their inner ends, and a chain to extend in front of the animal's mouth, the endmost links of said chain receiving the inner portions of said spurs and being sufficiently small to prevent inward sliding therefrom, at least one of said spurs having a detachable connection with said stem.

2. A weaner comprising a stem threaded at each end, one of said ends being extended beyond the threaded portion and tapered to a sharp point, and spurs each of which is provided in its inner end with a threaded socket, said sockets being identical in size and shape to receive the pointed end of the stem whereby either spur may be engaged with said pointed end.

In testimony whereof I have hereunto affixed my signature.

ROY R. SIDDERS.